Dec. 6, 1932.  P. J. HUBER  1,890,328
AUTOMOBILE CASE CLAMP
Original Filed May 26, 1930   2 Sheets-Sheet 1
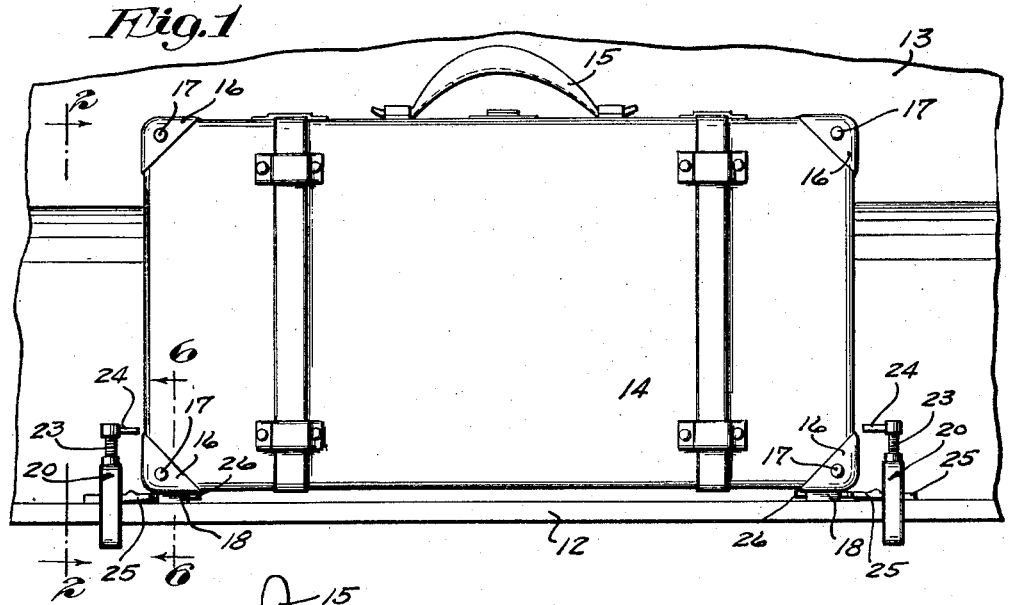
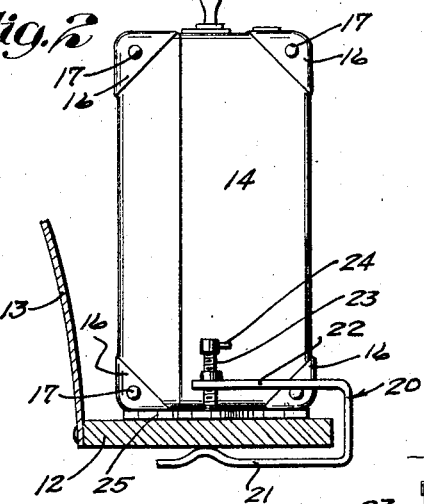
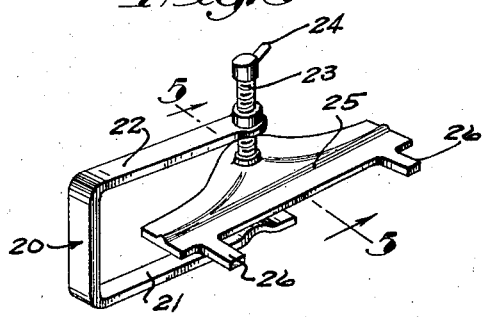
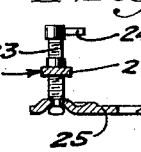
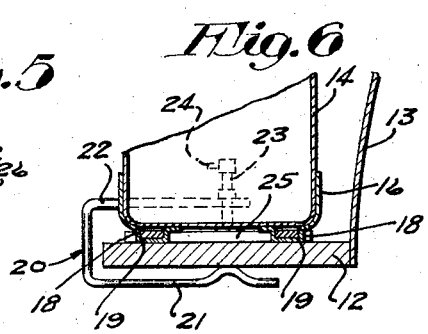
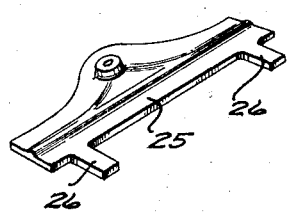
Inventor
Paul J. Huber
By his Attorneys Dec. 6, 1932.   P. J. HUBER   1,890,328
AUTOMOBILE CASE CLAMP
Original Filed May 26, 1930   2 Sheets-Sheet 2
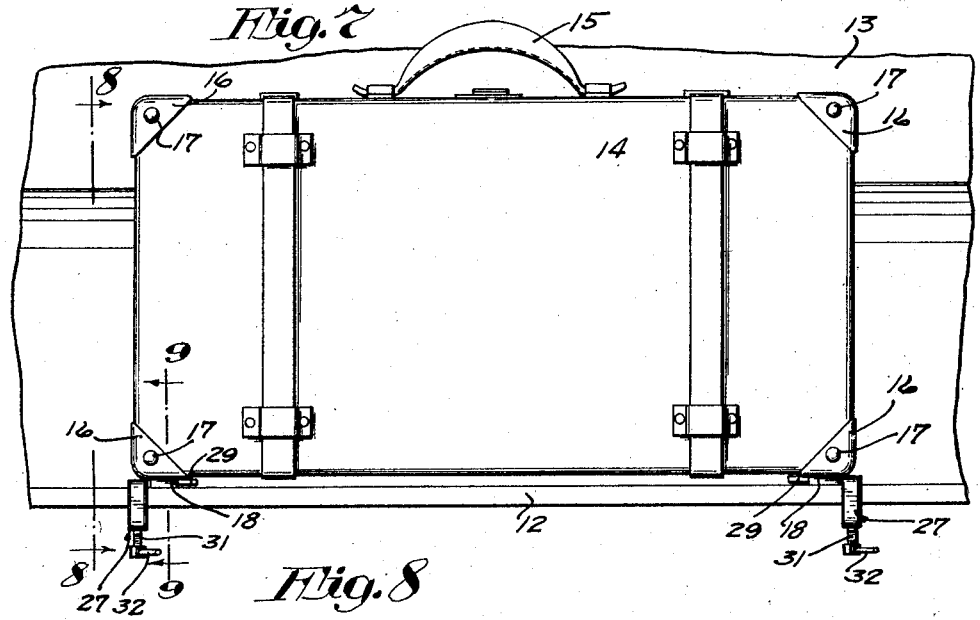
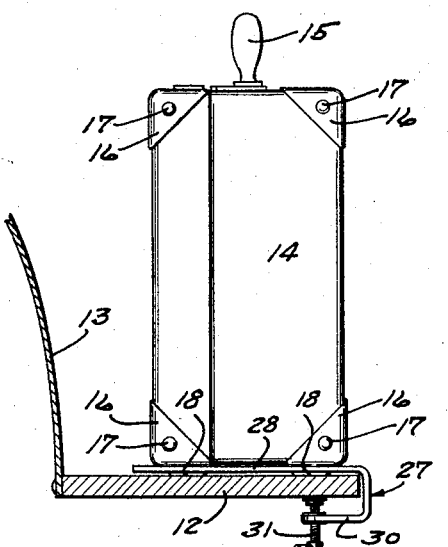
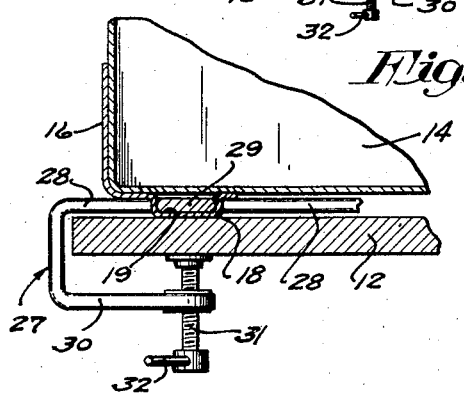
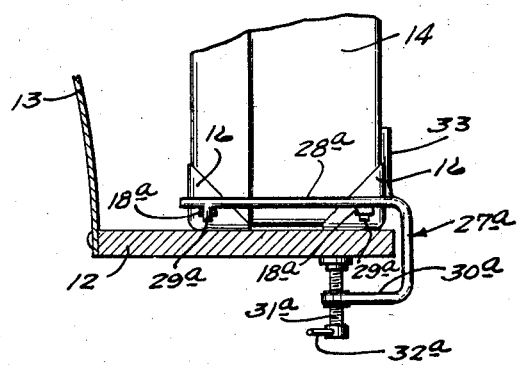
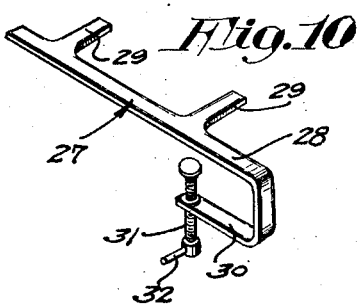
Inventor
Paul J. Huber
By his Attorneys Patented Dec. 6, 1932

1,890,328

UNITED STATES PATENT OFFICE

PAUL J. HUBER, OF MINNEAPOLIS, MINNESOTA, ASSIGNOR OF ONE-THIRD TO FRANK W. PETERSON AND ONE-THIRD TO WILLIAM H. WALLRAFF, BOTH OF MINNEAPOLIS, MINNESOTA

AUTOMOBILE CASE CLAMP

Application filed May 26, 1930, Serial No. 455,719. Renewed July 28, 1932.

My present invention relates to clamping devices for detachably securing suitcases, trunks and the like to suitable supports, such as automobile running boards and has for its main object to provide devices in the form of improvements on or modifications of the automobile case clamp disclosed in my prior Patent 1,750,669 of date March 18, 1930.

Generally stated, the invention consists of the novel devices, combinations of devices and arrangement of parts hereinafter described and defined in the claims.

In the accompanying drawings, which illustrate the invention, like characters indicate like parts throughout the several views.

Referring to the drawings:

Fig. 1 is a fragmentary side elevation of an automobile running board and body and showing a suitcase secured thereon, by one form of my clamping devices;

Fig. 2 is a section taken on the line 2—2 of Fig. 1;

Fig. 3 is a perspective view of the form of clamping devices illustrated in Figs. 1 and 2;

Fig. 4 is a perspective view of the base plate of the clamping device shown in Fig. 3;

Fig. 5 is a sectional view taken on the line 5—5 of Fig. 3;

Fig. 6 is a section taken on the line 6—6 of Fig. 1;

Fig. 7 is a view in elevation corresponding to Fig. 1, but showing a somewhat modified form of clamping device;

Fig. 8 is a sectional view taken on the line 8—8 of Fig. 7;

Fig. 9 is an enlarged fragmentary section taken on the line 9—9 of Fig. 7;

Fig. 10 is a perspective view of a clamping device, illustrated in Figs. 7, 8 and 9; and Fig. 11 is a view similar to Fig. 8, but having part of the case broken away and showing another slightly modified form of clamping device.

Referring first to Figs. 1 to 6 inclusive wherein the automobile running board is indicated by the numeral 12 and a portion of the automobile body by the numeral 13. The numeral 14 indicates a conventional type of suitcase provided at its upper top portion with a handle 15 and its corners with reinforcing caps 16 secured thereon by means of rivets or the like 17. These corner reinforcing caps 16 are here illustrated and are usually made of metal but may, however, be made of leather or other suitable material. The bottoms of the reinforcing caps 16 are stamped out at 18 to form support-engaging feet opening longitudinally through which are clamp lug receiving eyes 19. The case 14 is at all times in spaced relation to the running board or base of support by means of the feet 18 so that in case of rain, water running down the sides of the body will flow thereunder without soaking the bottom of the case.

The clamping devices for securing opposite ends of the case 14 to the running board or other base of support, as illustrated in Figs. 1 to 6, each comprising a U-shaped bracket 20, the lower arm 21 of which is adapted to project beneath and engage the underside of the running board and the upper arm 22 of which is adapted to project above and in parallel relation to one end of the case 14. Working through and having screw-threaded engagement with the inner end of the upper bracket arm 22 is a clamp screw 23 that is provided at its upper end with an operating wing 24. Carried by the clamping screw 23 and having swiveled engagement with the lower end portion thereof is a base plate 25 that is adapted to rest on the running board in parallel relation to its end of the case and projecting inward from the base plate 25 are spaced lugs 26. These lugs 26 are spaced apart a distance equal to that of the eyes on their end of the case and are insertable therein.

When the case is placed properly on the running board, the clamping devices with their screws 24 are loosened sufficiently to permit the running board to be interposed between the base plate. The lower bracket arms 21 are slid inwardly transversely to the running board and in parallel relation to the end of the case until the horizontally projecting lugs 26 align with the eyes 19 on their end of the case and then said base plate is moved toward the case to insert the lugs 26 into their cooperating eyes and then by tightening the clamp screws 23, the base plate 25 will become firmly clamped to the running board. The case will, by said base plates, be positively held against movement on the running board. It will, of course, be apparent that the lugs 26 of the base plates 25 might be inserted into their cooperating eyes before the case is placed on the running board and the clamp screws 23 tightened after the case is positioned. With this form of device, the case can be quickly clamped onto the running board of an automobile without reaching under the running board and because the lower portion of the clamping device, which is beneath the running board is in very close relation thereto, there is very little chance in it being struck and jerked loose by objects projecting from the road over which the car passes.

Referring next to Figs. 7 to 10 inclusive wherein parts like those illustrated in Figs. 1 to 6 inclusive are indicated by like characters. The form of clamping device illustrated in these figures comprises a U-shaped clamping bracket 27, the upper arm 28 of which is provided with horizontally projecting lugs 29 that are spaced apart a distance equal to that of the eyes 19 on one end of the casing and are insertable one into each of said eyes on the same end of the casing. Working through and having screw-threaded engagement with the inner end portion of the lower bracket arm, indicated by the numeral 30, is a clamping screw 31 having at its lower end an operating wing 32. The lugs 29 may be inserted into their cooperating eyes 19 either before or after the case is applied to the running board and when the clamp screw 31 is tightened the case will be firmly held in position on the running board.

Referring next to the slightly modified form of device shown in Fig. 11 wherein the suitcase and parts of the automobile corresponding to those shown in previous figures are indicated by like characters and parts of the clamping device corresponding to those shown in Figs. 7 to 10 inclusive are indicated by like characters plus the exponent "a". In this form of device, the pressed-out portions 18ª of the reinforcing caps 16, which portions form the eyes 19, are pressed from the sides of the reinforcing caps 16 at the ends of the case than at the bottom thereof and the lugs indicated by the numeral 29ª depend from and are insertable downward into the eyes 18ª. The upper arm 28ª of the U-shaped clamping bracket 27ª is provided with an upstanding brace lug 33 that is adapted to engage the outside of the case 14 and brace the same against outward tilting movements.

What I claim is:

1. In combination with a case provided near its bottom corners with eyes, clamping devices for securing opposite ends of the case to a base of support each comprising a U-shaped clamping bracket the lower arm of which is adapted to be extended beneath the base of support and the upper arm of which is adapted to be extended above the base of support in parallel relation to one end of the case, a base plate carried by the upper arm of each bracket and having swiveled connection thereto, said base plate being adapted to rest upon the base of support at one end of the case and having lugs projected therefrom in spaced relation and insertable through the eyes on that end of the case, and a clamping screw carried by one of said bracket arms whereby the base plate may be clamped to the base support thereby securing the case in place thereon.

2. In combination with a case provided near each of its bottom corners with an eye opening longitudinally of the case, base plates adapted to rest on the base of support one near each end of the case, spaced projecting lugs on each of said base plates that are insertable through the eyes on their end of the casing, and clamping devices for clamping the base plates on the base of support and thereby securing the case on said base of support each comprising a U-shaped bracket the lower arm of which is adapted to be extended under and engage the bottom of the base of support and the upper arm of which carries a clamping screw that is adapted to engage the top of the base plate at its end of the casing.

3. The combination with a casing provided near its bottom corners with eyes, clamping devices for securing opposite ends of the case to a suitable base of support each comprising a U-shaped bracket the lower arm of which is adapted to be extended beneath and engage the bottom of the base of support and the upper arm of which is adapted to be extended above the base of support at one end of the casing, a clamping screw working through and having screw-threaded engagement with the upper arm, a base plate carried by the lower end portion of said screw and having swiveled engagement therewith and being adapted to rest upon the base of support near one end of the case, and spaced lugs projecting from said base plate and each thereof being insertable through an eye at that end of the case whereby when the said screws are tightened the base plate will be clamped on the base of support and the case thereby held in position.

4. In combination with a case provided near its bottom end portions with eyes, clamping devices for securing opposite ends of the case to a base of support each comprising a U-shaped clamping bracket the lower arm of which is adapted to be extended beneath the base of support and the upper arm of which is adapted to be extended above the base of support in parallel relation to one end of the case, a base plate carried by the upper arm of each bracket and having swiveled connection thereto, said base plate being adapted to rest upon the base of support at one end of the case and having a lug projected therefrom and insertable through an eye on that end of the case, and a clamp carried by one of said bracket arms whereby the base plate may be clamped to the base support thereby securing the case in place thereon.

In testimony whereof I affix my signature.

PAUL J. HUBER.